(12) United States Patent
Karttaavi (10) Patent No.: US 9,098,762 B2
(45) Date of Patent: Aug. 4, 2015

(54) DISCRIMINATION OF RFID SOURCES AND ASSOCIATED APPARATUS

(75) Inventor: Timo Petteri Karttaavi, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/350,361

(22) PCT Filed: Oct. 13, 2011

(86) PCT No.: PCT/IB2011/054541
§ 371 (c)(1),
(2), (4) Date: Apr. 7, 2014

(87) PCT Pub. No.: WO2013/054158
PCT Pub. Date: Apr. 18, 2013

(65) Prior Publication Data
US 2014/0239067 A1    Aug. 28, 2014

(51) Int. Cl.
G06K 7/00 (2006.01)
G06K 7/10 (2006.01)
G06K 7/08 (2006.01)
H04B 7/06 (2006.01)
H01Q 25/00 (2006.01)

(52) U.S. Cl.
CPC ............ *G06K 7/10019* (2013.01); *G06K 7/086* (2013.01); *H01Q 25/002* (2013.01); *H04B 7/0695* (2013.01)

(58) Field of Classification Search
CPC ............ G06K 7/0008; G06K 7/10019; G06K 7/10128; G06K 7/10316; G06K 7/10346
USPC ................................................ 235/439, 449
See application file for complete search history.

(56) References Cited

U.S. PATENT DOCUMENTS

| | | | | |
|---|---|---|---|---|
| 4,196,436 | A * | 4/1980 | Westerman | 342/380 |
| 2009/0160638 | A1* | 6/2009 | Jesme | 340/539.11 |
| 2009/0289873 | A1* | 11/2009 | Schilling et al. | 343/893 |

FOREIGN PATENT DOCUMENTS

| | | |
|---|---|---|
| EP | 1758256 | 2/2007 |
| WO | 2010/105633 A1 | 9/2010 |
| WO | 2011101695 | 8/2011 |

OTHER PUBLICATIONS

International Search Report received for corresponding Patent Cooperation Treaty Application No. PCT/IB2011/054541, dated Jun. 29, 2012, 5 pages.

(Continued)

*Primary Examiner* — Seung Lee
(74) *Attorney, Agent, or Firm* — Locke Lord LLP (57) ABSTRACT

In one or more embodiments described herein, there is provided an apparatus configured for use with one or more directional antennas. The one or more directional antennas each have a respective directional axis, a first sensitivity region being proximal to the directional axis and associated with a first variation in sensitivity across the first region, and a second sensitivity region being distal to the directional axis and associated with a second variation in sensitivity across the second region. The second variation in sensitivity is greater than the first variation in sensitivity. The apparatus is configured to discriminate one source of radio frequency identification signalling at a particular angular position from other neighboring sources of radio frequency identification signalling by using the alignment of one or more second sensitivity regions with respect to the particular angular position.

20 Claims, 4 Drawing Sheets

(56) References Cited

OTHER PUBLICATIONS

Karmakar, N.C. "Development of Smart Antenna for RFID Reader", RFID, 2008 IEEE International Conference on Date of Conference Apr. 16-17, 2008. pp. 65-73.

Hartmann, P. et al. "Anti-Collision methods for global SAW RFID tag systems", Ultrasonics Symposium, 2004 IEEE, Date of Conference Aug. 23-27, 2004. pp. 805-808 vol. 2.

"Conical Scanning", Wikipedia, Retrieved on Sep. 4, 2014, Webpage available at : http://en.wikipedia.org/wiki/Conical_scanning.

Pursula et al., "Millimeter-Wave Identification—A New Short-Range Radio System for Low-Power High Data-Rate Applications", IEEE Transactions on Microwave Theory and Techniques, vol. 56, Issue 10, Oct. 2008, pp. 2221-228.

* cited by examiner

DISCRIMINATION OF RFID SOURCES AND ASSOCIATED APPARATUS

RELATED APPLICATION

This application was originally filed as PCT Application No. PCT/IB2011/054541 filed Oct. 13, 2011.

TECHNICAL FIELD

The present disclosure relates to the field of discrimination of radio frequency identification (RFID) sources of signalling, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices may be so-called Personal Digital Assistants (PDAs), laptops, notebooks, electronic book readers, portable computers, tablet computers, and the like.

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Radio-frequency identification (RFID) in its various modes is a widely used technology. RFID tags are often needed to be produced at very low cost and ideally consume minimal power. This can result in a restricted reading range. Currently, RFID systems operate mainly at frequencies below 2.4 GHz. The relatively long wavelength means that practical antenna structures are electrically small and no significant directivity can be achieved. The systems either read all tags within a certain range or some kind of addressing scheme is used.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising:
at least one processor;
at least one memory having computer program code stored thereon, the at least one memory and computer program code being configured to, when run on the at least one processor, cause the apparatus to perform at least the following:
discriminating one source of radio frequency identification signalling at a particular angular position from other neighbouring sources of radio frequency identification signalling by using the alignment of one or more of a second sensitivity region of one or more directional antennas with respect to the particular angular position, wherein the one or more directional antennas each has:
a respective directional axis;
a first sensitivity region being proximal to the directional axis and associated with a first variation in sensitivity across the first region;
a second sensitivity region being distal to the directional axis and associated with a second variation in sensitivity across the second region, the second variation in sensitivity being greater than the first variation in sensitivity.

The at least one memory and computer program code may be configured to, when run on the at least one processor, cause the apparatus to:
determine respective signal strengths of a plurality of sources of radio frequency identification signalling using the one or more second sensitivity regions;
identify, based on the variation in determined respective signal strengths, which source of radio frequency signalling is at the particular angular position to thereby discriminate the one source of radio frequency identification signalling at the particular angular position.

The at least one memory and computer program code may be configured to, when run on the at least one processor, cause the apparatus to:
align the respective one or more corresponding second sensitivity regions on a first side of the particular angular position to provide a first mode; and
align the respective one or more corresponding second sensitivity regions on a second side of the particular angular position to provide a second mode,
discriminate one source of radio frequency identification signalling at the particular angular position based on a comparison of the determined signal strengths from the respective sources detected in the first and second modes.

The at least one memory and computer program code may be configured to, when run on the at least one processor, cause the apparatus to:
align the respective one or more corresponding first sensitivity regions with the particular angular position to define a third mode; and
provide of radio frequency identification signalling of the discriminated source at the particular angular position using the third mode.

The at least one memory and computer program code may be configured to, when run on the at least one processor, cause the apparatus to:
align the one or more second sensitivity regions of at least one of the one or more directional antennas with respect to the particular angular position by performing one or more of:
physically moving the at least one directional antenna; and
electrically altering a radiation characteristic of the at least one directional antenna.

The at least one memory and computer program code may be configured to, when run on the at least one processor, cause the apparatus to:
vary the alignment of the one or more second sensitivity regions of at least one directional antenna with respect to the particular angular position by causing rotation of the at least one directional antenna's respective second sensitivity region around the particular angular position.

The at least one memory and computer program code may be configured to, when run on the at least one processor, cause the apparatus to:

alternately switch between respective multiple directional antennas to detect radio frequency signalling from the one source of radio frequency identification signalling at that particular angular position.

The other neighbouring sources of radio frequency identification signalling may be proximal to the particular angular position.

The apparatus may comprise one or more directional antennas.

The apparatus may comprise a patch antenna array comprising at least two sub-antenna chains, each sub-antenna chain comprising a plurality of sub-antennas in series with one another and each sub-antenna chain being configured to be in parallel with one another and to share a common electrical feed, wherein the patch antenna array is configured to:
 provide the first mode in response to detection of a first frequency of radio frequency identification signalling; and
 provide the second mode in response to detection of a second frequency of radio frequency identification signalling.

The at least one memory and computer program code may be configured to, when run on the at least one processor, cause the apparatus to:
 align the respective one or more corresponding second sensitivity regions with the particular angular position to thereby provide for greater variation in determined signal strengths from respective sources via the second variation in sensitivity across the second sensitivity regions.

The apparatus may be one or more of:
a portable electronic device, and a module for a portable electronic device.

In another aspect, there is provided a method comprising:
 discriminating one source of radio frequency identification signalling at a particular angular position from other neighbouring sources of radio frequency identification signalling by using the alignment of one or more of a second sensitivity region of one or more directional antennas with respect to the particular angular position, wherein the one or more directional antennas each has:
 a respective directional axis;
 a first sensitivity region being proximal to the directional axis and associated with a first variation in sensitivity across the first region;
 a second sensitivity region being distal to the directional axis and associated with a second variation in sensitivity across the second region, the second variation in sensitivity being greater than the first variation in sensitivity.

In another aspect, there is provided a computer program, the computer program comprising:
 code for discriminating one source of radio frequency identification signalling at a particular angular position from other neighbouring sources of radio frequency identification signalling by using the alignment of one or more of a second sensitivity region of one or more directional antennas with respect to the particular angular position, wherein the one or more directional antennas each has:
 a respective directional axis;
 a first sensitivity region being proximal to the directional axis and associated with a first variation in sensitivity across the first region;
 a second sensitivity region being distal to the directional axis and associated with a second variation in sensitivity across the second region, the second variation in sensitivity being greater than the first variation in sensitivity.

In another aspect, there is provided an apparatus, the apparatus configured for use with one or more directional antennas, the one or more directional antennas each having:
 a respective directional axis;
 a first sensitivity region being proximal to the directional axis and associated with a first variation in sensitivity across the first region;
 a second sensitivity region being distal to the directional axis and associated with a second variation in sensitivity across the second region, the second variation in sensitivity being greater than the first variation in sensitivity;
 wherein the apparatus is configured to:
 discriminate one source of radio frequency identification signalling at a particular angular position from other neighbouring sources of radio frequency identification signalling by using the alignment of one or more second sensitivity regions with respect to the particular angular position.

In another aspect, there is provided an apparatus, the apparatus configured for use with one or more means for directionally detecting radio frequency identification signalling each having:
 a respective directional axis;
 a first sensitivity region being proximal to the directional axis and associated with a first variation in sensitivity across the first region;
 a second sensitivity region being distal to the directional axis and associated with a second variation in sensitivity across the second region, the second variation in sensitivity being greater than the first variation in sensitivity;
 wherein the apparatus comprises:
 means for discriminating configured to discriminate one source of radio frequency identification signalling at a particular angular position from other neighbouring sources of radio frequency identification signalling by using the alignment of one or more second sensitivity regions with respect to the particular angular position.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

It will be appreciated that when one "processor" or one "memory" is referred to, that this may incorporate (in other examples) more than one processor" or more than one "memory".

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:—

DESCRIPTION OF EXAMPLE ASPECTS/EMBODIMENTS

RFID technology uses an addressing scheme that operates via reading (e.g. unique) identities of one or more RFID tags (or other such radio frequency signalling sources). For example, if a user wishes to read a particular tag via selective reading, an RFID reader presently known in the art would set up an electromagnetic field for reading RFID tags (or other such radio frequency identification sources) via an antenna. All tags within that field can then respond to the reader indicating their own unique identity. Once the RFID reader has determined the identities of each transmitting/responding RFID tag, the reader then instructs each tag in turn to transmit in isolation until it identifies the particular source it is interested in. After this point, communication between the RFID tag of interest and the RFID reader can begin.

With current RFID systems, selective tag reading can only be done from a very short distance (as in near-field-communications, NFC) or by using pre-existing information about the tag (identification by address code etc).

P. Pursula, T. Vaha-Heikkila, A. Muller, D. Neculoiu, G. Konstantinidis, A. Oja, J. Tuovinen, "Millimeter-Wave Identification—A New Short-Range Radio System for Low-Power High Data-Rate Applications," IEEE Transactions on Microwave Theory and Techniques, Volume 56, Issue 10, pp. 2221-2228, October 2008 discusses the use of millimeter waves with RFID technology (for example, using low-power or passive backscattering tags for short-range high data rate applications).

A directive antenna beam, such as those achieved using millimeter wave frequencies can help in selective reading of a single tag. However, even with millimeter-wave antennas, practical and technological issues present in the art limit radio frequency identification systems to a level that does not entirely eliminate co-channel interference when the unwanted tags transmit within range.

Figure 1:
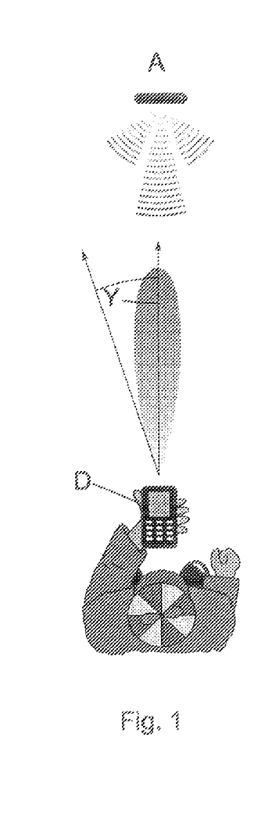
FIG. 1 illustrates an example apparatus with a directional antenna.
Figure 2:
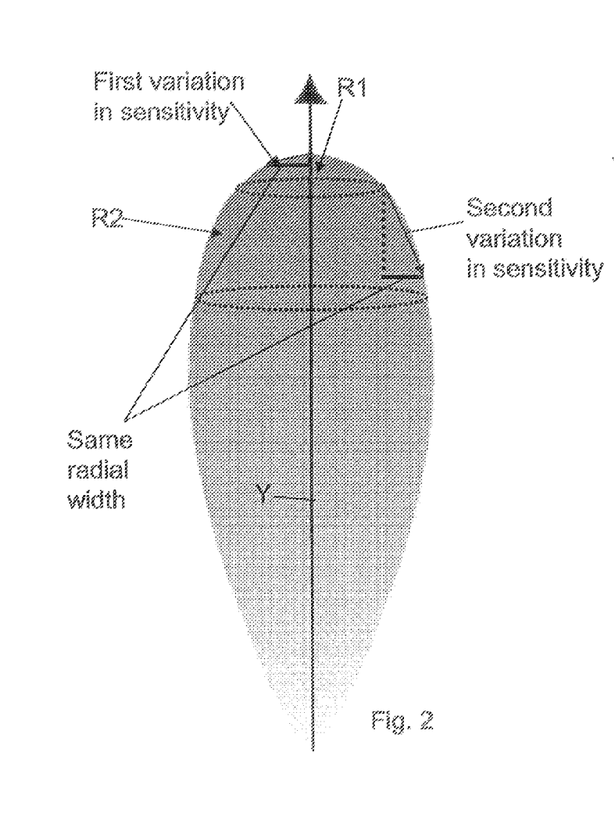
FIG. 2 illustrates a schematic of a directional antenna and its radiation pattern.

FIG. 1 illustrates an example of a user operating a portable electronic device, D, for RFID tags that has just such a directional antenna for selective reading of a source of RFID signalling. In this example, the user wishes to read a single tag, A, and the device D will do so using a directional antenna that it comprises (not shown). FIG. 2 helps to illustrate the radiation pattern of the antenna which has a shape similar to that of an inflated balloon. Please note that this is intended to provide an approximate three dimensional representation of the radiation pattern in this example. It should also be noted that directional antennas can provide radiation patterns with other shapes and that these are also within the scope of the present disclosure, though for the sake of simplicity we will look primarily at the radiation patterns shaped in a similar way to FIGS. 1-3.

The antenna of the device D in FIG. 1 has a directional axis, Y, along which this balloon-shaped radiation pattern is directed. The directional axis Y of the antenna is also in line with the direction that the user is aiming the device D (shown in FIG. 1). As there is only one RFID tag (tag A) to be read, interference is not a problem. However, it can become problematic for a device such as device D to discriminate signalling from a particular source out of a plurality of neighbouring sources that a user wishes to read.

Figure 3:
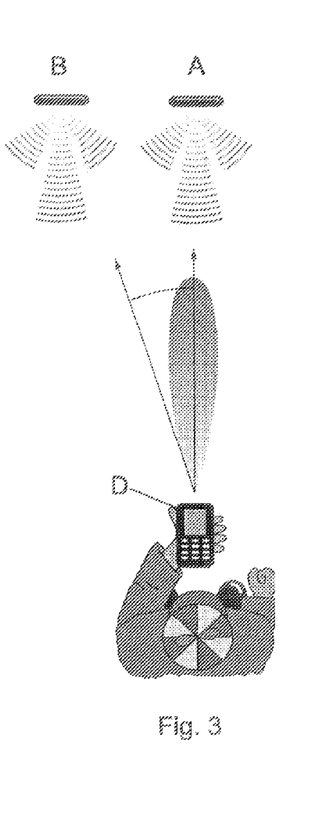
FIG. 3 illustrates an example scenario.

FIG. 3 illustrates difficulties that occur when a user tries to selectively read one tag (tag A) when there are other neighbouring tags. In essence, the device will receive two separate readings from tag A and tag B but the proximity of the two tags to the reading extremity of the antenna radiation pattern means that it will be unable to distinguish between the two tags and to discriminate which source is the one the user was really interested in. The next step would be to actually read that tag and interrogate that particular source to determine data or information stored thereon. This issue is addressed in certain embodiments of the present disclosure.

There are aspects of the radiation pattern of the directional antenna that are not being used that can be exploited to remedy this issue. We will now describe this with reference to FIG. 2. In this figure we have divided the radiation pattern R into a first sensitivity region, R1, and a second sensitivity region R2. The first region R1 is located at the top-most part of the radiation pattern R. This first region R1 is proximal to the directional axis and is relatively flat in profile.

As has been shown in FIGS. 1 and 3, in the prior art it is standard practice to use the extremity of the radiation pattern of the antenna to perform selective tag reading. We will refer to this extremity as the first sensitivity region R1. This first sensitivity region R1 is used in the art as standard practice for various reasons. For example, the first region R1 is the furthest point of the radiation pattern from the antenna and represents the strongest area of the radiation pattern which therefore provides the greatest range of reading for the apparatus. However, as a result of this relatively flat sensitivity profile across this region, the variation in sensitivity to received signalling does not change that much from one point of the region to any other point of the region. This makes it difficult to discriminate which tags are on-axis and which are slightly off-axis.

As already discussed with reference to FIG. 3, a user wishes to use the same device D from FIG. 1 to read single RFID tag A, but in close proximity to tag A is the undesired neighbour tag B. Because the variation in sensitivity of the first region R1 of the antenna is relatively small, this means that regardless of whether a tag is on-axis or slightly off-axis, there will be little difference in received signal strengths for the two tags A and B. As a result, both tags will have substantially similar signal strengths to each other and the device can have difficulty discriminating which is actually the tag of interest to a user.

Figure 4:
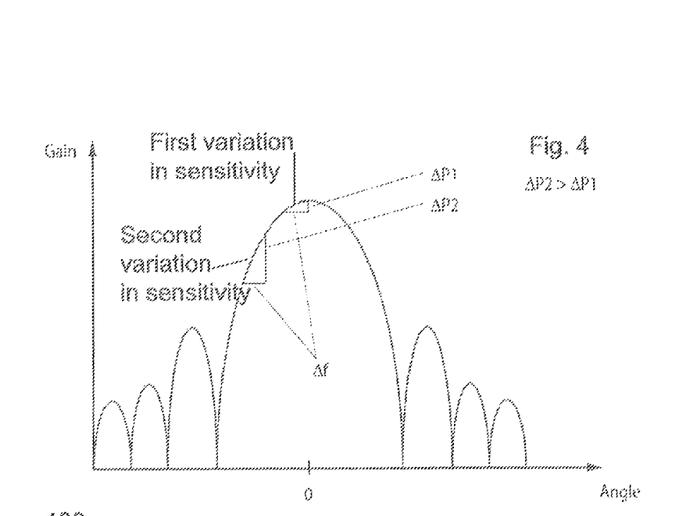
FIG. 4 illustrate sensitivity information about a directional antenna.

In contrast with the first region R1 of the directional antenna's radiation pattern, we will now look at the second sensitivity region R2. This has been labelled as the other side of the dotted line designating first region R1. The second region R2 is located further away, i.e. distal, from the directional axis of the antenna. Second region R2 can also be considered to be peripheral to, or the periphery of, the radiation pattern. The variation in sensitivity across the second sensitivity region R2 is greater than that of the first sensitivity region R1. We have illustrated this with the basic vector illustration in the first and second sensitivity regions R1, R2, which show that for a given radial distance away from the axis, the sensitivity variation in the second sensitivity region R2 is greater than the sensitivity variation in the first sensitivity region R1. This is further illustrated in FIG. 4. This means that the second region R2 has a greater sensitivity to relative difference in position of tags than the first region R1.

Assuming that a particular source of radio frequency identification signalling of interest is located at a particular angular position from the device, it is possible to discriminate one source of radio frequency identification signalling from other neighbouring sources by using the alignment of the second sensitivity region R2 of the directional antenna with respect to that particular angular position in which the source of interest is located. More examples that utilise this idea of using the second sensitivity region of an antenna (or more than one antenna) are described in more detail below.

In one or more embodiments described herein, there is provided an apparatus configured for use with one or more directional antennas. The one or more directional antennas each have a respective directional axis, a first sensitivity region being proximal to the directional axis and associated with a first variation in sensitivity across the first region, and a second sensitivity region being distal to the directional axis and associated with a second variation in sensitivity across the second region. The second variation in sensitivity is greater than the first variation in sensitivity. The apparatus is configured to discriminate one source of radio frequency identification signalling at a particular angular position from other neighbouring sources of radio frequency identification signalling by using the alignment of one or more second sensitivity regions with respect to the particular angular position.

This apparatus allows for discrimination and identification of a particular source via the respective signal strengths received from multiple sources. Through doing this, it is possible to selectively read a particular radio frequency signalling source without necessarily having to establish its radio frequency identity (as is presently the addressing scheme used in the prior art). For example, if a user was interested in a particular source (such as an RFID tag), the user can physically point this apparatus at a particular desired source to indicate the selection of that source, and the apparatus would be able to discriminate which source (out of a plurality of other neighbouring sources) was at a particular angular position.

Figure 5A:
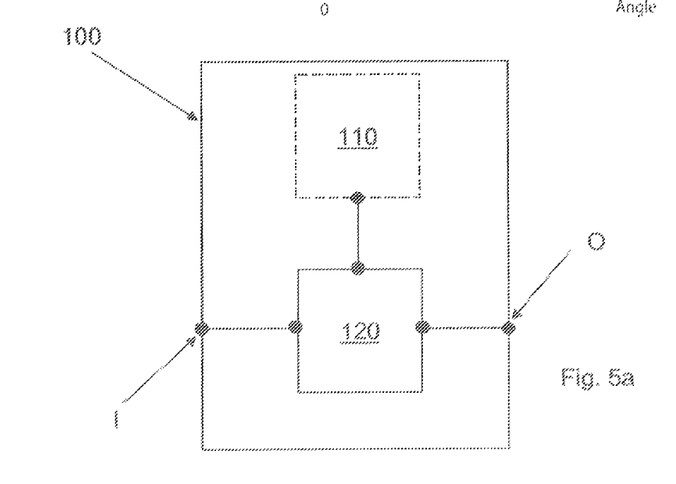
FIGS. 5a and 5b illustrate a first embodiment.

We will now describe a first embodiment with reference to FIG. 5a.

FIG. 5a shows an apparatus 100 which comprises a directional antenna 110 and an application specific integrated circuit (ASIC) 120. In this example the apparatus 100 is integrated within a portable electronic device (see FIG. 5b). The apparatus 100 also has an input I and output O that form an input/output bus I/O. This bus I/O allows the apparatus 100 to electrically communicate with the rest of the portable electronic device within which it is integrated. The skilled person will appreciate that in other embodiments the various components of the apparatus 100 may be separate from each other and/or distributed separately/remotely from each other throughout another device. For example, in this example the apparatus 100 comprises the directional antenna 110, but in other examples the apparatus 100 does not comprise the antenna 110 but is merely connected to a separate antenna 110. This could already be comprised by a portable electronic device (like that in FIG. 5b or FIG. 9). We have shown this by outlining antenna 110 in a dashed line.

The directional antenna 110 is configured to be able to generate a radiation pattern like that illustrated in FIG. 2, although the antenna 110 can be configured to provide one or more other types of radiation patterns.

The directional antenna 110 in this example embodiment operates at 60 GHz. This can help to provide a highly directional radiation pattern along a particular axis. In other embodiments, the apparatus 100 and antenna 110 operate on 122 GHz and/or 244 GHz or higher, and in other embodiments the apparatus 100 and antenna 110 operate on lower frequencies or frequencies between 2.4 GHz, 60 GHz, 122 GHz and 244 GHz, or higher. In some embodiments the antenna 110 and apparatus 100 may be able to operate on two or more such frequencies. The skilled person will appreciate that other such frequencies (for example, intermediate and/or non-intermediate) are within the scope of the present disclosure. One advantage to using millimeter waves is that they propagate through some objects more easily than shorter electromagnetic waves such as infrared, visible light etc. A source could therefore be placed inside of a person's clothing (e.g. a device in a pocket) and still be read irrespective of its location about a user's person.

The directional antenna 110 is able to receive radio frequency identification signalling from one or more sources and to provide the received signalling onto the ASIC 120. This reception of signalling can be understood as detection of signalling. This can take the form of active monitoring of radio frequency identification signalling, or passive monitoring of radio frequency identification signalling. These aspects could also be initiated manually or automatically, or can be user-configurable in a device incorporating apparatus 100.

ASIC 120 is able to receive the radio frequency signalling from the antenna 110 and discriminate one source of radio frequency identification signalling from other neighbouring sources, the signalling having been received by the antenna 110 using the second sensitivity region R2 of the directional antenna 110 that was aligned with the particular angular position that the tag/source of interest was located in (rather than the first sensitivity region R1 being aligned therewith).

In this example, the ASIC 120 is composed of a processor and a memory as integrated functional blocks within the ASIC 120. The memory comprises computer program code configured to cause certain actions to be performed. These are discussed in more detail below.

In another example, the ASIC 120 receives signalling from the antenna 110 and utilises the processing capabilities of a separate processor or CPU (e.g. part of a portable electronic device within which the apparatus 100 is integrated/connected) to perform the discrimination. Therefore in different examples the ASIC 120 can be a routing circuit that sends the received signalling onwards to a separate processor for analysis, or in other examples the ASIC 120 can be a processing circuit or processor (with or without memory) in its own right. The computer program code necessary to control the operations of the processor could be stored on a memory within the ASIC 120, or stored on separate memory/memories (e.g. local to a portable electronic device on which the apparatus 100 is installed). Similarly, the computer program code may be distributed between multiple memories of the same type, or multiple memories of a different type, such as ROM, RAM, Flash or the like.

The ASIC 120 is able to provide an indication as to which source is a particular desired source onwards via output O. This allows for the information carried by a particular source to be identified and discriminated at substantially the same time that the information is being transmitted.

In this example, the input I and the output O are part of/define a connection bus that electrically interfaces the processor/apparatus 100 with a portable electronic device. The skilled person will appreciate that, in other embodiments, the input I and output O may be other components that allow for electrical communication to the apparatus 100. This can allow the completed apparatus 100 to be installed into a portable electronic device. The skilled person will appreciate that in other embodiments the apparatus 100 may be remotely located from the portable electronic device and receive signalling at a different location.

The output O is for onward provision of the indication of a discriminated particular signalling source as discriminated by the ASIC 120. This indication can be provided onward to other components, such as a display of a device (like device D in FIGS. 1 and 3, or device 400 in FIG. 9 discussed below) for displaying the information carried by the discriminated particular source, or the like. In examples where another processor is recruited as part of the discrimination of the particular source of interest, the input/output bus I/O is used to provide and receive corresponding signalling in relation to such operations.

Figure 5B:
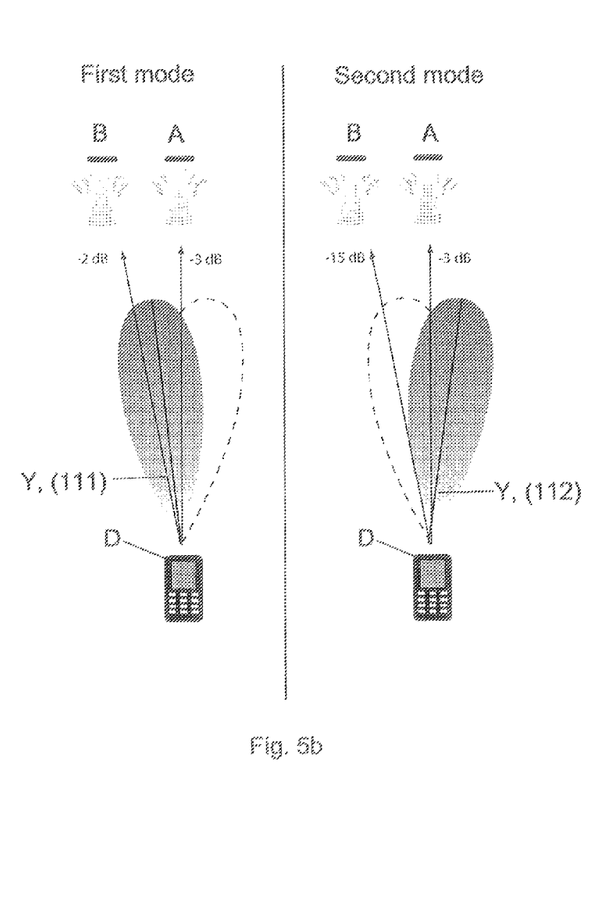

We will now describe the operation of the embodiment of FIG. 5a with respect to FIG. 5b.

In FIG. 5b, there are two tags, A & B. One of these two tags (tag A) is of particular interest to the illustrated user. The user is holding an RFID tag reader in accordance with apparatus 100. This reader comprises apparatus 100, central processing unit (not shown), memory (not shown), and a user interface 130 (in this example, a touch sensitive display).

The directional antenna 110, as discussed above, provides a specific electromagnetic field pattern that is highly directional. In this embodiment, the antenna 110 is highly sensitive along a single axis as is illustrated by the radiation pattern in FIG. 2. The display 130, as discussed above, is for displaying information about a particular source once it has been discriminated and also allowing for user input. Other types of output or data logging systems may be used to read and/or store information about a particular tag of interest that has been selectively read.

As the user is interested in one of the two tags (tag A rather than tag B), the user directs the reader device D at the desired tag A. In this example this involves the user orienting the reader substantially at tag A.

As has been discussed, in the prior art the directional axis of the directional antenna 110 would be aligned with the particular angular position of tag A. This would mean that the first sensitivity region R1 of the apparatus 100 would be aligned with the particular angular position of the tag which the user wishes to read. However, as has already been discussed the relatively little variation in sensitivity across the first sensitivity region R1 of such antenna radiation patterns means that it can be difficult or impossible to discriminate between tag A and tag B via this method. Instead, in the present example the ASIC 120 (i.e. the processor and memory with computer program code stored thereon) are configured to align the second sensitivity region to provide a first mode and also to provide a second mode.

In the first mode, the second sensitivity region R2 of the antenna 110 is aligned on a first side of the particular angular position in which a source of interest (tag A) is located. In this example the particular angular position has tag A located within it and the first side is the left side of that particular angular position. In the second mode, the second sensitivity region R2 is aligned on a second side of the particular angular position, which in this example is the right side of tag A. It can be seen that the two modes are mirror images of each other, in that the radiation pattern of the antenna 110 in each mode is tilted to the same extent on each side (e.g. the first mode has the directional axis Y tilted 20' to the left of the particular angular position, and the second mode has the directional axis Y tilted 20' to the right of the particular angular position).

It will be noted that in each of these modes the second sensitivity regions R2 of the respective patterns shown are proximal/close to the particular angular position in which the tag of interest is located. It can also be seen that the directional axis of the antenna 110 in each mode is not aligned with the particular angular position of tag A. The apparatus 100 is configured to detect radio frequency identification signalling from both tags A and B in both the first mode and also in the second mode. Because the second sensitivity region R2 (as illustrated in FIG. 2) has a much greater variation in sensitivity across it, there are more pronounced variations in received signal strengths from the respective signal strengths.

In the first mode, two tags will be detected as being in proximity to the radiation pattern of the antenna 110. Tag B is measured as being −2 dB and tag A is measured as being −3 dB. This is because the second sensitivity region R2 is aligned to the left side of the particular angular position in which the desired source is to be located. The second sensitivity region is therefore roughly equidistant from both tag A and tag B. As a result, from these readings alone, it is not clear whether tag A or tag B is the tag of interest to the user because the relative signal strengths are too similar to discriminate between a tag of interest and an interfering tag. For example, the difference of 1 dB between tag A and tag B is relatively small and could be due to the desired tag being further away from the apparatus 100 than the neighbouring tag. Therefore, from these readings it is no more likely that tag A is the desired tag/source as it is that tag B is the desired tag/source.

However, in the second mode, the readings are different and the variation in the signal strengths can be used to discriminate exactly which source (i.e. tag) the user wishes to read. Tag B, where previously the signal strength from tag B in the first mode was at −2 dB strength the signal strength in the second mode is now −15 dB. This is because the second sensitivity region is now aligned to a different side of the particular angular position in which the desired tag is located, and therefore the distance between the second sensitivity region R2 and tag B is much greater. As a result, the relative signal strength for tag B in the second mode is much weaker than in the first mode. However, tag A still reads as −3 dB because of the symmetry between the two reading modes, as the second sensitivity region is located the same distance away from particular angular position in which tag A is located in the second mode as it was in the first mode.

Considering the first and second modes superimposed on one another, it can be seen that there is a position along the boresight of the apparatus 100 (i.e. the line along which an apparatus 100 is aimed towards a particular source) which lies between the inner right side of the antenna 110 radiation pattern of the first mode and the inner left side of the antenna 110 radiation pattern of the second mode. This defines a particular angular position between modes in which a source can be located and, using the second sensitivity regions R2 positioned proximally to that particular angular position in the two modes, can be discriminated as the source of interest in that particular angular position. Therefore, from these two sets of determined relative signal strength readings in the first and second mode, the ASIC 120 of the apparatus 100 can identify (either independently or in conjunction with the central processing unit of the device) which source of radio frequency identification signalling is located at the particular angular position. In this case, it is possible to determine which tag is in the particular angular position at which the user is aiming the device.

In this example, the apparatus is configured to switch between the first and second modes rapidly, e.g. at a frequency of 1-20 Hz (but can be a higher or lower switching frequency). The apparatus 100 is configured to be able to move between these modes via physical movement of the antenna and therefore the second sensitivity region. As another example, the apparatus 100 can move between these modes via electrical alteration of a radiation characteristic of the antenna 110. This can cause the actual radiation pattern of the antenna 110 to tilt between the different modes without needing physical movement of the antenna. In another example, the apparatus 100 is configured to move between the first and second modes by rotating the radiation pattern, and therefore the corresponding second sensitivity region R2, about the particular angular position. It will be appreciated by the skilled pattern that there are various ways that the second sensitivity region R2 can be aligned for such signalling detection (e.g. physical movement of the antenna 110, or electrical alteration of a radiation characteristic of the antenna 110 (for example) to electrically steer the radiation pattern).

In another example, instead of just one directional antenna 110, the first mode is provided by a first directional antenna 111 and the second mode is provided by a second directional antenna 112. In essence, the two modes described above for the single directional antenna 110 example are provided by two separate directional antennas 111, 112. The first directional antenna 111 is configured to align its corresponding second sensitivity region R2 on a first side of the particular angular position and the second directional antenna 112 is configured to align its corresponding second sensitivity region R2 on a second side of the particular angular position. The two antennas are then switched between rapidly. In another example the antennas 111 and 112 are simultaneously operational, though additional processing may be required to eliminate any cross-talk or signal contamination between the two antennas.

In essence, the apparatus 100 can comprise one or potentially more directional antennas that are configured so that their one or more corresponding second sensitivity regions are aligned with the particular angular position to thereby provide for greater variation in determined signal strengths from respective sources via the second variation in sensitivity across the second sensitivity regions. This allows for discrimination of one source of radio frequency identification signalling from other neighbouring sources by virtue of the variation in determined signal strengths.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

Figure 6:
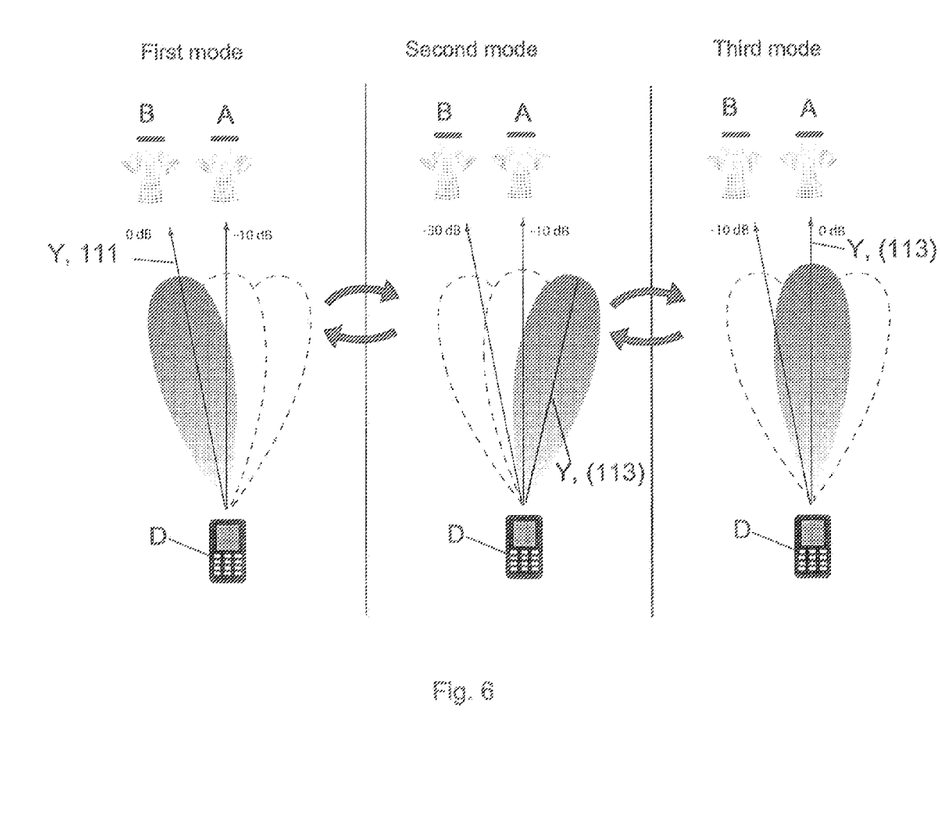
FIG. 6 illustrates a second embodiment.

FIG. 6 shows a second example embodiment with apparatus 100 integrated in a device D, but with a variation on the method of operation. In this example, the apparatus 100 operates in exactly the same way as apparatus 100 except that it also has a third mode in which the first sensitivity region of the directional antenna is aligned with the particular angular position. This mode can be provided by a dedicated central directional antenna (113), or can be provided by switching a single antenna (like antenna 110) between the respective modes in the manner described above. This can also be combined with any of the other examples given above, for example, to provide a single switching antenna for the first and second modes and a dedicated central antenna for the third mode, or to provide dedicated antennas for all three modes, or other examples.

As per the scenario outlined in FIG. 5b, the apparatus 100 has been instructed to read sources of RFID signalling and is trying to discriminate which tag the user interested in, i.e. which source is located in the particular angular position. It has already been shown that it is possible to perform this discrimination based on just the first and second modes. However, it can be advantageous to provide a third mode for direct reading of any tags directly in-front of the apparatus 100 so as to obtain the strongest and therefore best quality signal reading from those tags. Although a direct reading with a single central antenna 113 may not yield enough information to discriminate between tag A and tag B in isolation, in combination with the first and second modes it is possible to more conclusively discriminate tag A as being the source located at the particular angular position and then use the strong, good quality reading of data from that tag (tag A) at the same time as performing discrimination.

Figure 7A:
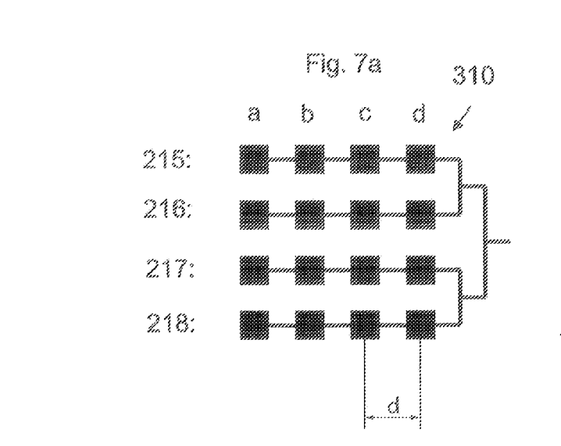
FIGS. 7a and 7b illustrate a further antenna arrangement.
Figure 7B:
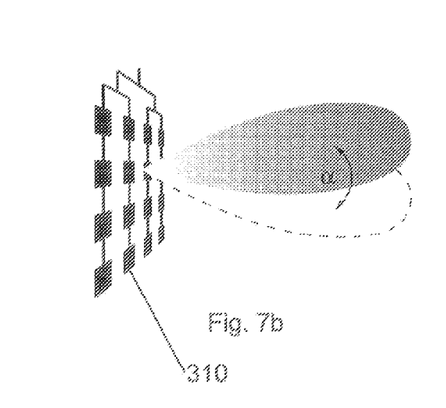

FIGS. 7a and 7b show a patch antenna arrangement 250 that can allow for electronic steering or 'squinting' of an antenna radiation pattern.

Beam squinting is a phenomenon that occurs when a source transmits signalling at different frequencies. In beam squinting, the radiation pattern of the antenna turns in at least one dimension as a function of the signal frequency that it is receiving from a source of signalling. For example, in the context of RFID tags, a given tag can be configured to transmit signalling alternately between a first frequency and a second frequency. As a result, the 'perceived' radiation pattern from the point of view of the RFID tag will be tilted in one direction for the first frequency and a different direction for the second frequency. The exact nature and extent of the tilt will depend on the antenna in question and the frequencies being transmitted.

This beam squinting phenomenon is an undesirable phenomenon in most transmission scenarios and many prior art documents attempt to mitigate the squinting effect. This phenomenon is particularly prominent in chain-fed patch antenna arrays. This is illustrated in FIGS. 7a and 7b. FIG. 7a illustrates a chain-fed patch antenna array 210 with four sub-antenna chains 215, 216, 217, 218 and each having sub-antennas (215a-218d). In such chain-fed patch antenna arrays (like 210), the squint angle depends roughly on the element spacing (d) in terms of free-space wavelength. By placing the elements closer to each other, the squint angle increases. In theory, the angle can also be increased by setting the phase difference of adjacent elements to e.g. 720° instead of 360° at a centre frequency. This can be likened to the patch antenna array being configured to provide the first mode (discussed in relation to FIG. 5b/6) in response to detection of radio frequency identification signalling at a first frequency, and to provide the second mode (also discussed in relation to FIG. 5b/6) in response to detection of radio frequency identification signalling at a second frequency.

FIG. 7b illustrates how the angle of the antenna 310 radiation pattern shifts according to the incoming frequency of radio frequency identification signalling. The antenna 310 can be configured by varying the sub-antenna spacing, number of chains of sub-antennas, numbers of sub-antennas within the chains, electrical feed, and the like to help optimise the change in angle of the radiation pattern of the antenna 310 in response to particular frequency signalling. This can allow for electrical alteration of a radiation characteristic of the antenna to align the second sensitivity region R2 of the antenna 110 accordingly. This could provide any number of configurations depending on the number of transmitted frequencies of radio frequency identification signalling.

Figure 8:
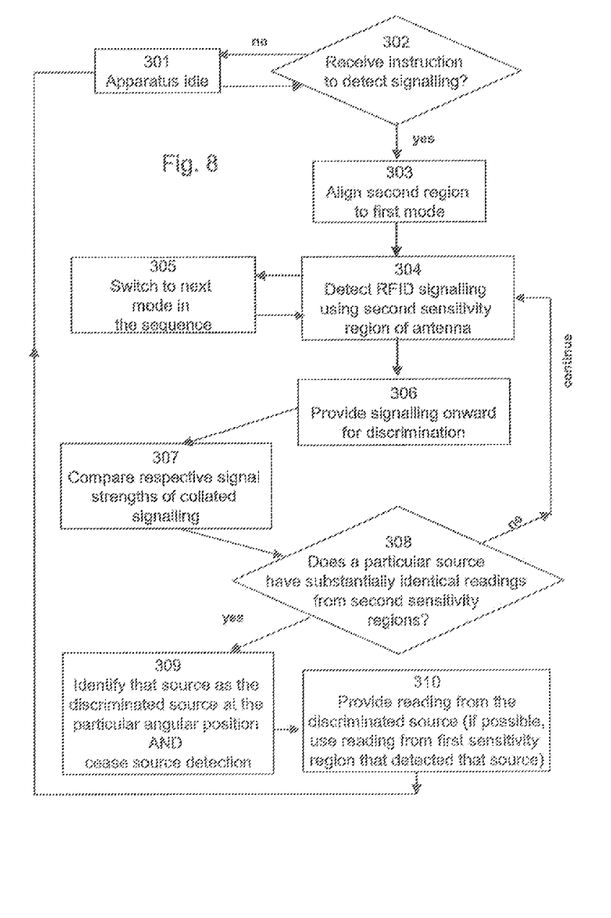
FIG. 8 illustrates a method flowchart.

FIG. 8 illustrates a method of operation of the apparatus in accordance with the various embodiments described above.

The apparatus 100 is integrated as part of a portable electronic device (as per the examples of FIGS. 5a and 5b, and FIG. 6). In this example the apparatus 100 starts in an idle mode (step 301) to prevent unnecessary energy wastage until instructed to detect signalling from sources (step 302).

Upon instruction to detect signalling the apparatus 100 aligns the second sensitivity region R2 to the first mode (step 303) and then subsequently detects RFID signalling using the second sensitivity region R2 of the antenna 110/111 (step 304). After this the apparatus 100 switches to the next mode in the sequence (step 305) and continues to repeatedly do so while acquiring/detecting RFID signalling via step 304 in each mode.

At the same time, the detected signalling is provided onward for discrimination of one source of radio frequency identification signalling (step 306). The collated signalling and their respective signal strengths for each source (received from each mode) are then compared with one another (step 307).

From the compared signal strength readings, as illustrated in FIGS. 5a and 5b and FIG. 6 it can be seen that if a particular source has substantially identical readings from second sensitivity regions (i.e. modes where the reading relied upon is received via the second sensitivity regions, like the first and second modes described above) then it can be determined that such a source is located in the particular angular position and is the source of interest to the user. Step 308 therefore uses the comparison of step 307 to establish whether substantially identical readings from second sensitivity readings have been shown or not. If not, then the method flow returns to step 304 to keep detecting and ultimately comparing signalling. If so, then the method identifies that particular source as the discriminated source at the particular angular position (step 309) and then ceases source detection.

Once the particular source has been discriminated, the apparatus can provide a reading from that source (step 310). If applicable (e.g. as in the embodiment of FIG. 6) then the reading can be provided from the reading in the third mode where the source would have been directly read using the first sensitivity region of the radiation pattern of the antenna 110.

Figures 9, 10:
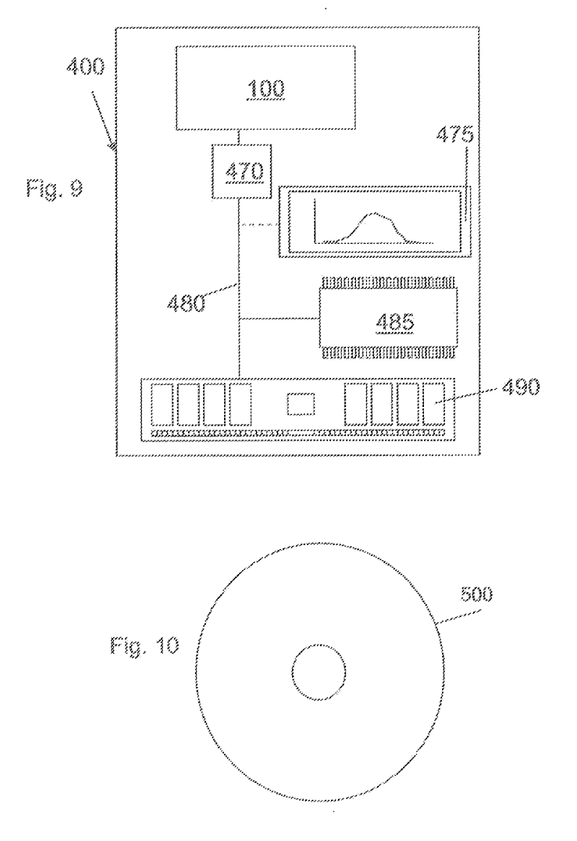
FIG. 9 illustrates another example.
FIG. 10 illustrates schematically a computer readable media providing a program according to an embodiment of the present invention.

FIG. 9 illustrates how the various embodiments described above can be implemented in an electronic device 600. FIG. 8 illustrates schematically a device 400 (such as a portable mobile telephone or portable electronic device like that of device D in FIGS. 5a, 5b and 6) comprising the apparatus 100 as per any of the embodiments described above.

The device 400 may be an electronic device (including a tablet personal computer), a portable electronic device, a portable telecommunications device, or a module for any of the aforementioned devices. The apparatus 100 can be provided as a module for such a device 400, or even as a processor for the device 400 or a processor for a module for such a device 400. The device 400 also comprises a processor 485 and a storage medium 490, which are electrically connected to one another by a data bus 480. This data 480 can be seen to provide an active coupling between the processor 485 and the storage medium 490 to allow the processor 480 to access the computer program code.

The apparatus 100 is first electrically connected to an input/output interface 470 that receives the output from the apparatus 100 and transmits this onwards to the rest of the device 400 via data bus 480. Interface 470 can be connected via the data bus 480 to a display 475 (touch-sensitive or otherwise) that provides information from the apparatus 100 to a user. Display 475 can be part of the device 400 or can be separate.

The device 400 also comprises a processor 485 that is configured for general control of the apparatus 100 as well as the rest of the device 400 by providing signalling to, and receiving signalling from, the other device components to manage their operation.

The storage medium 490 is configured to store computer code configured to perform, control or enable the making and/or operation of the apparatus 100. The storage medium 490 may also be configured to store settings for the other device components. The processor 485 may access the storage medium 490 to retrieve the component settings in order to manage the operation of the other device components. The storage medium 490 may be a temporary storage medium such as a volatile random access memory. On the other hand, the storage medium 490 may be a permanent storage medium such as a hard disk drive, a flash memory, or a non-volatile random access memory.

FIG. 10 illustrates schematically a computer/processor readable media 500 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units or any combination of memories coupled to the processor or in multi-processor implementations of the processor(s) described above.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor;
   at least one memory having computer program code stored thereon, the at least one memory and computer program code being configured to, when run on the at least one processor, cause the apparatus to perform at least the following:
   discriminating one source of radio frequency identification signalling at a particular angular position from other neighbouring sources of radio frequency identification signalling by using an alignment of one or more of a second sensitivity region of one or more directional antennas by controlling beam squint phenomenon of the antennas with respect to the particular angular position, wherein the one or more directional antennas each has:
   a respective directional axis;
   a first sensitivity region being proximal to the directional axis and associated with a first variation in sensitivity across the first region;
   a second sensitivity region being distal to the directional axis and associated with a second variation in sensitivity across the second region, the second variation in sensitivity being greater than the first variation in sensitivity.

2. The apparatus of claim 1, wherein the at least one memory and computer program code are configured to, when run on the at least one processor, cause the apparatus to:
   determine respective signal strengths of a plurality of sources of radio frequency identification signalling using the one or more second sensitivity regions;
   identify, based on the variation in determined respective signal strengths, which source of radio frequency signalling is at the particular angular position to thereby discriminate the one source of radio frequency identification signalling at the particular angular position.

3. The apparatus of claim 1, wherein the at least one memory and computer program code are configured to, when run on the at least one processor, cause the apparatus to:
   align the respective one or more corresponding second sensitivity regions on a first side of the particular angular position to provide a first mode; and
   align the respective one or more corresponding second sensitivity regions on a second side of the particular angular position to provide a second mode,
   discriminate one source of radio frequency identification signalling at the particular angular position based on a comparison of the determined signal strengths from the respective sources detected in the first and second modes.

4. The apparatus of claim 3, wherein the at least one memory and computer program code are configured to, when run on the at least one processor, cause the apparatus to:
   align the respective one or more corresponding first sensitivity regions with the particular angular position to define a third mode; and
   provide one source of radio frequency identification signalling of the discriminated source at the particular angular position using the third mode.

5. The apparatus of claim 3, wherein the apparatus comprises a patch antenna array comprising at least two sub-antenna chains, each sub-antenna chain comprising a plurality of sub-antennas in series with one another and each sub-antenna chain being configured to be in parallel with one another and to share a common electrical feed, wherein the patch antenna array is configured to:
   provide the first mode in response to detection of a first frequency of radio frequency identification signalling; and
   provide the second mode in response to detection of a second frequency of radio frequency identification signalling.

6. The apparatus of claim 1, wherein the at least one memory and computer program code are configured to, when run on the at least one processor, cause the apparatus to:

align the one or more second sensitivity regions of at least one of the one or more directional antennas with respect to the particular angular position by performing one or more of:
   physically moving the at least one directional antenna; and
   electrically altering a radiation characteristic of the at least one directional antenna.

7. The apparatus of claim 1, wherein the at least one memory and computer program code are configured to, when run on the at least one processor, cause the apparatus to:
   vary the alignment of the one or more second sensitivity regions of at least one directional antenna with respect to the particular angular position by causing rotation of the at least one directional antenna's respective second sensitivity region around the particular angular position.

8. The apparatus of claim 1, wherein the at least one memory and computer program code are configured to, when run on the at least one processor, cause the apparatus to:
   alternately switch between respective multiple directional antennas to detect radio frequency signalling from the one source of radio frequency identification signalling at that particular angular position.

9. The apparatus of claim 1, wherein the other neighbouring sources of radio frequency identification signalling are proximal to the particular angular position.

10. The apparatus of claim 1, wherein the apparatus comprises one or more directional antennas.

11. A method comprising:
   discriminating one source of radio frequency identification signalling at a particular angular position from other neighbouring sources of radio frequency identification signalling by using an alignment of one or more of a second sensitivity region of one or more directional antennas by control of beam squint phenomenon of the antennas with respect to the particular angular position, wherein the one or more directional antennas each has:
   a respective directional axis;
   a first sensitivity region being proximal to the directional axis and associated with a first variation in sensitivity across the first region;
   a second sensitivity region being distal to the directional axis and associated with a second variation in sensitivity across the second region, the second variation in sensitivity being greater than the first variation in sensitivity.

12. A method of claim 11 comprising:
   determining respective signal strengths of a plurality of sources of radio frequency identification signals using one or more second sensitivity regions;
   identifying, based on variations in determined respective signal strengths, which source of radio frequency signal is at the particular angular position to thereby discriminate the one source of the radio frequency identification signal at the particular angular position.

13. A method of claim 11 comprising:
   aligning the respective one or more corresponding second sensitivity regions on a first side of a particular angular position to provide a first mode: and align the respective one or more corresponding second sensitivity regions on a second side of a particular angular position to provide a second mode,
   discriminating one source of radio frequency identification signal at a particular angular position based on a comparison of the determined signal strengths from the respective sources detected in the first and second modes.

14. A method of claim 13 comprising:
   aligning the respective one or more first sensitive regions with the particular angular position to define a third mode; and
   providing one source of radio frequency identification signalling of the discriminated source at a particular angular position using the third mode.

15. The method of claim 11 further configured to:
   aligning the one or more second sensitivity regions of at least one of the one or more directional antennas with respect to the particular angular position by performing one or more of:
      physically moving the at least one directional antenna; and
      electrically altering a radiation characteristic of the at least one directional antenna.

16. The method of claim 11 further configured to:
   varying the alignment of the one or more second sensitivity regions of at least one directional antenna with respect to the particular angular position by causing rotation of the at least one directional antenna's respective second sensitivity region around the particular angular position.

17. The method of claim 11 further configured to:
   alternately switch between respective multiple directional antennas to detect radio frequency signalling from the one source of radio frequency identification signalling at that particular angular position.

18. A non-transitory computer readable storage medium in which the computer program code is stored, the computer program causing an apparatus to perform the following when executed by a processor:
   discriminating one source of radio frequency identification signalling at a particular angular position from other neighbouring sources of radio frequency identification signalling by using an alignment of one or more of a second sensitivity region of one or more directional antennas by controlling beam squint phenomenon of the antennas with respect to the particular angular position, wherein the one or more directional antennas each has:
   a respective directional axis;
   a first sensitivity region being proximal to the directional axis and associated with a first variation in sensitivity across the first region;
   a second sensitivity region being distal to the directional axis and associated with a second variation in sensitivity across the second region, the second variation in sensitivity being greater than the first variation in sensitivity.

19. A non-transitory computer readable storage medium in which the computer program code is stored of claim 18, the computer program causing an apparatus to perform the following when executed by a processor:
   determine respective signal strengths of a plurality of sources of radio identification signalling using the one or more second sensitive regions;
   identify, based on the variation in determined respective signal strengths, which source of the radio signalling is the particular angular position.

20. A non-transitory computer readable storage medium in which the computer program code is stored of claim 19, the computer program causing an apparatus to perform the following when executed by a processor:
   align the respective one or more corresponding first sensitivity regions with the particular angular position to define a third mode; and provide one source of radio frequency identification signalling of the discriminated source at the particular angular position using the third mode.

* * * * *